(12) United States Patent
Maruyama et al.

(10) Patent No.: US 9,073,413 B2
(45) Date of Patent: Jul. 7, 2015

(54) VEHICLE DOOR STRUCTURE

(71) Applicant: KABUSHIKI KAISHA TOYOTA JIDOSHOKKI, Kariya-shi, Aichi (JP)

(72) Inventors: Katsuya Maruyama, Kariya (JP); Hiroshi Kuno, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 14/254,419

(22) Filed: Apr. 16, 2014

(65) Prior Publication Data

US 2014/0312650 A1    Oct. 23, 2014

(30) Foreign Application Priority Data

Apr. 17, 2013  (JP) .................. 2013-086585

(51) Int. Cl.
*B60J 5/04*   (2006.01)
*B60J 5/06*   (2006.01)

(52) U.S. Cl.
CPC ... *B60J 5/06* (2013.01); *B60J 5/047* (2013.01)

(58) Field of Classification Search
CPC ............ B60J 5/06; B60J 5/047; B60J 5/0479
USPC ............... 296/155, 203.03, 146.9, 146.13, 296/146.06; 49/143, 163, 209, 360, 169; 292/DIG. 3; 16/91
See application file for complete search history.

(56) References Cited

U.S. PATENT DOCUMENTS

| | | | |
|---|---|---|---|
| 6,477,806 B1* | 11/2002 | Asada et al. ............. | 49/169 |
| 6,616,214 B2* | 9/2003 | Wattebled ................ | 296/146.1 |
| 6,848,737 B2* | 2/2005 | Mikolai et al. ............. | 296/146.9 |
| 6,926,342 B2* | 8/2005 | Pommeret et al. ........... | 296/155 |
| 6,955,389 B2* | 10/2005 | Suzuki et al. .............. | 296/146.4 |
| 7,097,229 B1* | 8/2006 | Chernoff ................... | 296/146.1 |
| 7,320,495 B2* | 1/2008 | Menke ...................... | 296/146.1 |
| 7,950,704 B2* | 5/2011 | Kovie ....................... | 292/336.3 |
| 2006/0197357 A1* | 9/2006 | Catania ...................... | 296/155 |
| 2012/0167468 A1 | 7/2012 | Hozumi et al. | |
| 2014/0077523 A1* | 3/2014 | Choi ........................ | 296/146.9 |

FOREIGN PATENT DOCUMENTS

| | | |
|---|---|---|
| EP | 1 134 104 A1 | 9/2001 |
| EP | 1 942 025 A1 | 7/2008 |
| FR | 2 818 591 A1 | 12/2014 |
| JP | 2011-046271 A | 3/2011 |
| JP | 2012-081797 A | 4/2012 |

OTHER PUBLICATIONS

Communication dated Dec. 15, 2014, issued by the European Patent Office in counterpart European application No. 14163484.0.

* cited by examiner

*Primary Examiner* — Pinel Romain
(74) *Attorney, Agent, or Firm* — Sughrue Mion, PLLC

(57) ABSTRACT

A vehicle door structure equipped with a slide door that opens and closes a partial area of a door opening portion provided in a side portion or a rear portion of a vehicle body and a swing door that opens and closes the other partial area of the door opening portion along with the slide door, the vehicle door structure comprising: a slide door handle that is provided in the slide door so as to open and close the slide door; a swing door lock mechanism that locks the swing door to the vehicle body when the swing door is fully closed; and a swing door lock release mechanism that releases the locking of the swing door with respect to the vehicle body when the full opened state of the slide door is detected.

7 Claims, 18 Drawing Sheets

*Fig.3*
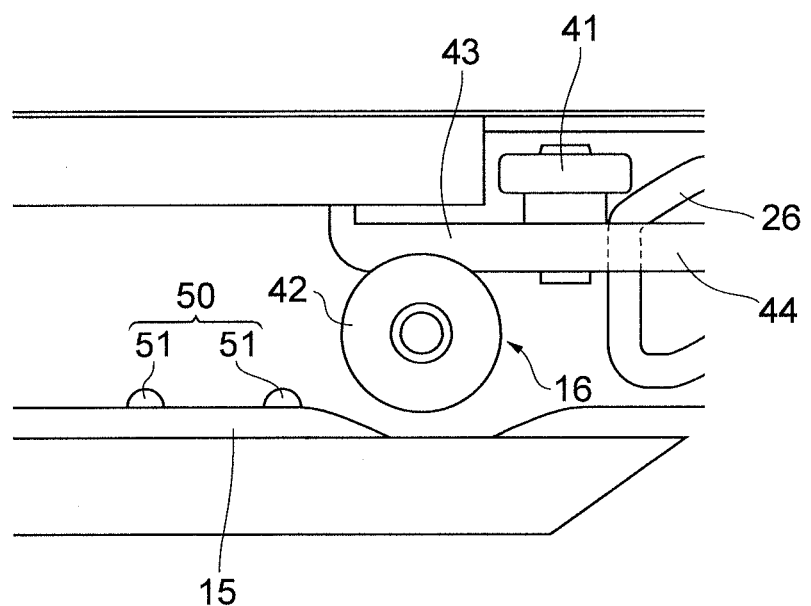
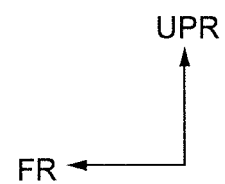

Fig.12
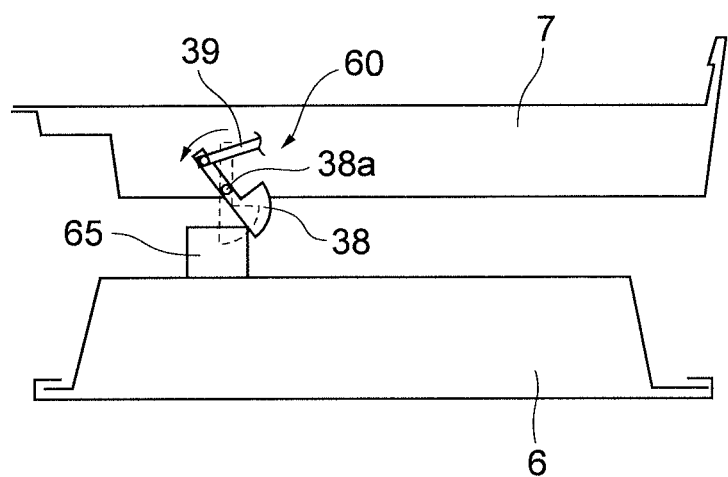
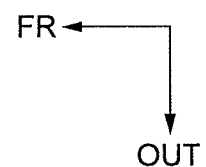

VEHICLE DOOR STRUCTURE

CROSS-REFERENCE TO RELATED APPLICATION:

This application is claiming priority based on Japanese Patent Application No. JP 2013-086585, filed Apr. 17, 2013, the contents of all of which are incorporated herein by reference in their entirety.

BACKGROUND OF THE INVENTION

1. Field of the Invention

The present invention relates to a vehicle door structure that includes a slidable opening/closing type slide door and a swingable opening/closing type swing door.

2. Related Background Art

For example, a vehicle door structure disclosed in Japanese Patent Application Laid-Open No. 2011-46271 is known as a vehicle door structure of the related art. The vehicle door structure disclosed in Japanese Patent Application Laid-Open No. 2011-46271 includes a slide door that opens and closes a front area of a rear door opening portion, a swing door that opens and closes a rear area of the rear door opening portion along with the slide door, an outer handle that is provided in an outer surface of the slide door and is used to open and close the slide door, an inner handle that is provided in an inner surface of the slide door and is used to open and close the slide door, and an opening and closing handle that is provided in a front edge of the swing door and is used to open and close the swing door. The slide door slides in the longitudinal direction of the vehicle body through a slide mechanism. The swing door rotates with respect to the vehicle body through a hinge mechanism while overlapping the slide door. Further, the vehicle door structure includes a swing door opening and closing regulation mechanism that connects (locks) the swing door and the vehicle body to each other when the swing door is fully closed.

However, the following problems exist in the related art. That is, there is a need to open the swing door by the operation of the opening and closing handle when the locking between the swing door and the vehicle body is released. Accordingly, there is a need to switch the outer handle or the inner handle to the opening and closing handle when the slide door is opened and then the swing door is opened, and hence the operation efficiency is degraded.

An object of the present invention is to provide a vehicle door structure capable of improving the efficiency of an operation of opening a slide door and then opening a swing door.

SUMMARY OF THE INVENTION

According to one embodiment of the present invention, there is provided a vehicle door structure equipped with a slide door that opens and closes a partial area of a door opening portion provided in a side portion or a rear portion of a vehicle body and a swing door that opens and closes the other partial area of the door opening portion along with the slide door, the vehicle door structure including: a slide door handle that is provided in the slide door so as to open and close the slide door; a lock unit that locks the swing door to the vehicle body when the swing door is fully closed; and a lock release unit that releases the locking of the swing door with respect to the vehicle body when the full opened state of the slide door is detected.

In this way, in the vehicle door structure according to one embodiment of the present invention, if the full opened state of the slide door is detected when the slide door is opened by the operation of the slide door handle in a state where the swing door is locked to the vehicle body, the swing door may be opened by releasing the locking of the swing door with respect to the vehicle body. Accordingly, since there is no need to switch the slide door handle when the slide door is opened and then the swing door is opened, the operation efficiency may be improved.

In one embodiment, the vehicle door structure may further include a slide door opening and closing regulation unit that regulates the operation of opening and closing the slide door before the slide door is fully opened. In this case, the position of the slide door may be maintained and fixed at the step before the slide door is fully opened. Accordingly, this configuration is effective in a case where only the slide door is opened and closed without opening and closing the swing door.

In one embodiment, the vehicle body may be provided with a first slide rail that extends in the slide door opening and closing direction, the swing door may be provided with a second slide rail that extends in the slide door opening and closing direction, the slide door may be provided with a first guide body guided by the first slide rail and a second guide body guided by the second slide rail, and the slide door opening and closing regulation unit may be configured as a plurality of protrusion portions that are provided in at least one of the first slide rail and the second slide rail and regulate a roller of at least one of the first guide body and the second guide body in the slide door opening and closing direction. In this case, the slide door opening and closing regulation unit may be realized by a simple configuration.

In one embodiment, the lock unit may include a lock member that is provided in the swing door and an engagement portion that is provided in the vehicle body and engages with the lock member, and the lock release unit may include a detection component that is provided in the slide door, a rotation member that is rotatably provided in the swing door and engages with the detection component when the slide door is fully opened, and a connection member that connects the lock member to the rotation member. In such a configuration, if the detection component contacts the rotation member so as to rotate the rotation member when the slide door is opened, it is detected that the slide door is fully opened. At this time, when the lock member is separated from the engagement portion through the connection member by the rotation of the rotation member, the locking of the swing door with respect to the vehicle body is released.

In one embodiment, the swing door may be provided with a slide rail that extends in the slide door opening and closing direction, the slide door may be provided with a guide body that is guided by the slide rail, and the detection component may be the guide body. In this case, since the full opened state of the slide door is detected when the existing guide body contacts the rotation member so as to rotate the rotation member, the number of components does not increase.

In one embodiment, the slide door may be provided with a protrusion portion that protrudes toward the swing door, and the detection component may be the protrusion portion. In this case, when the protrusion portion contacts the rotation member so as to rotate the rotation member, the full opened state of the slide door is detected. At this time, the full opened state of the slide door may be detected with high precision by providing the protrusion portion at an appropriate position of the slide door.

In one embodiment, the lock unit may include a lock member that is provided in the swing door and an engagement portion that is provided in the vehicle body and engages with the lock member, and the lock release unit may include a sensor that detects whether the slide door is fully opened and a drive unit that moves the lock member so that the lock member is separated from the engagement portion when the sensor detects that the slide door is fully opened. When the sensor and the drive unit are used in this way, it is possible to electrically detect the full opened state of the slide door and release the locking of the swing door with respect to the vehicle body even when a complex structure is not particularly provided.

According to the present invention, it is possible to improve the efficiency of the operation of opening the slide door and then opening the swing door. Thus, the swing door handle is not needed, and hence the merchantability may be improved.

BRIEF DESCRIPTION OF THE DRAWINGS

FIG. 3 is a schematic enlarged view illustrating a position that includes a lower slide rail and a guide body illustrated in FIGS. 2A to 2C.

FIG. 12 is a view illustrating another modified example of the swing door lock release mechanism illustrated in FIGS. 7A and 7B as still another embodiment of the vehicle door structure according to the present invention.

DESCRIPTION OF THE PREFERRED EMBODIMENTS

Figure 1:
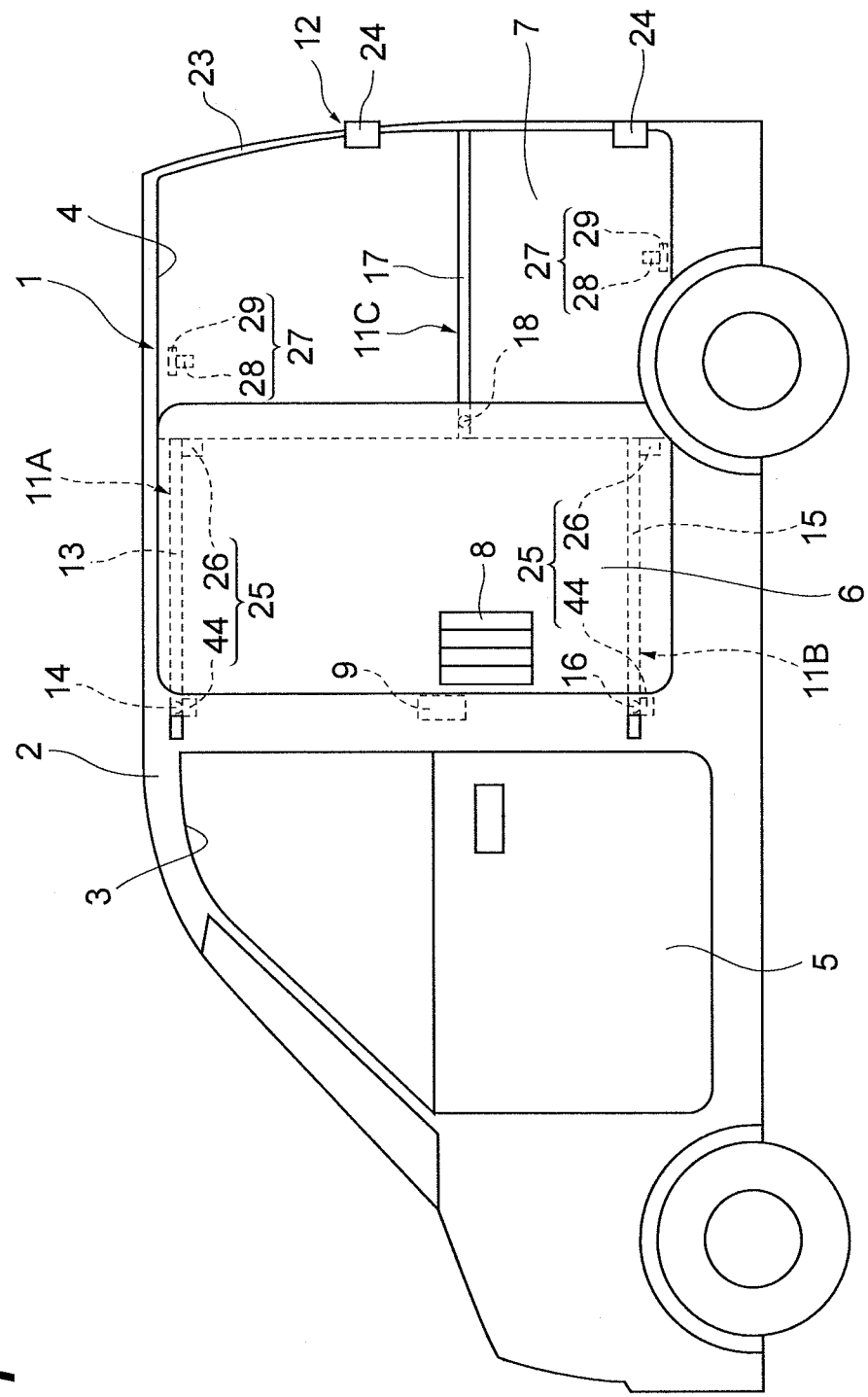
FIG. 1 is a side view illustrating a vehicle that includes an embodiment of a vehicle door structure according to the present invention.

Hereinafter, preferred embodiments of a vehicle door structure according to the present invention will be described in detail by referring to the drawings. Furthermore, in the drawings, the same reference numerals will be given to the identical or equivalent components, and the repetitive description thereof will not be repeated.

FIG. 1 is a side view illustrating a vehicle that includes an embodiment of the vehicle door structure according to the present invention. In the same drawing, a vehicle door structure 1 of this embodiment is applied to a side portion of a vehicle body 2. The side portion of the vehicle body 2 is provided with a front door opening portion 3 that is located at the lateral side of a front seat and a rear door opening portion 4 that is located at the lateral side of a luggage compartment provided at the rear side of the front seat. The front door opening portion 3 is opened and closed by a front door 5.

Figure 2A:
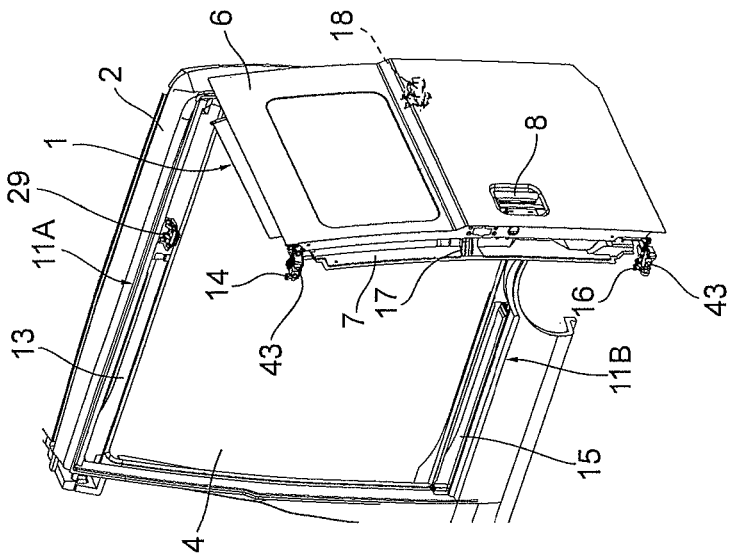
FIGS. 2A to 2C are perspective views illustrating a state where a slide door and a swing door illustrated in FIG. 1 are opened.
Figure 2B:
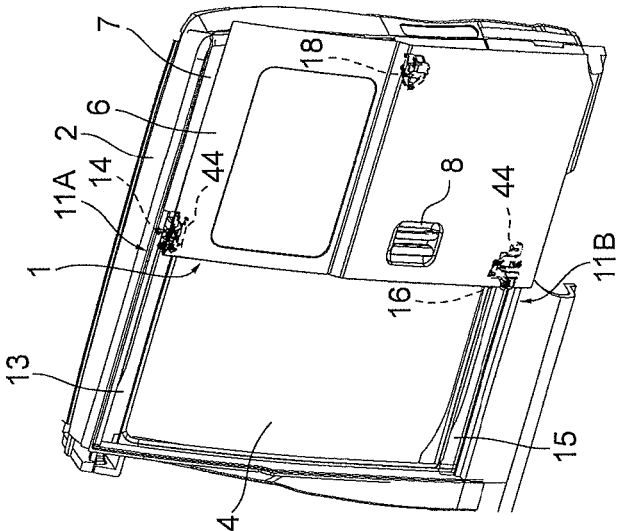

The rear door opening portion 4 is opened and closed by a slidable opening/closing type slide door 6 and a swingable opening/closing type swing door 7. As illustrated in FIGS. 2A and 2B, the slide door 6 is adapted to open and close the front area of the rear door opening portion 4 while sliding in the longitudinal direction of the vehicle body 2. In a state where the slide door 6 is fully opened, the slide door 6 is located at the outside of the swing door 7 so as to overlap the swing door 7 (see FIG. 2B).

Figure 2C:
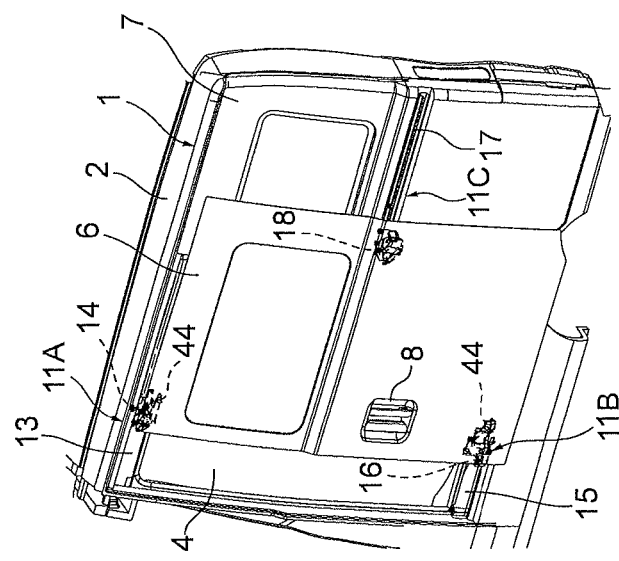

In a state where the slide door 6 is fully opened, the swing door 7 is adapted to open and close the rear area of the rear door opening portion 4 while rotating rotates with respect to the vehicle body 2 as illustrated in FIG. 2C along with the slide door 6.

The outer surface of the slide door 6 is provided with an outer door opening and closing handle 8, and the inner surface of the slide door 6 is provided with an inner door opening and closing handle 9. The opening and closing handles 8 and 9 are slide door handles that are used to open and close the slide door 6.

The vehicle door structure 1 includes slide support mechanisms 11A to 11C that slidably support the slide door 6 in the longitudinal direction of the vehicle body 2 and a rotation support mechanism 12 that rotatably supports the swing door 7 with respect to the vehicle body 2.

The slide support mechanism 11A includes an upper slide rail 13 that is provided in the upper portion of the vehicle body 2 so as to extend in the longitudinal direction of the vehicle body 2 (the opening and closing direction of the slide door 6) and a guide body 14 that is provided in the upper portion of the front end of the slide door 6 and is guided by the upper slide rail 13 when the slide door 6 is opened and closed.

The slide support mechanism 11B includes a lower slide rail 15 that is provided in the lower portion of the vehicle body 2 so as to extend in the longitudinal direction of the vehicle body 2 and a guide body 16 that is provided in the lower portion of the front end of the slide door 6 and is guided by the lower slide rail 15 when the slide door 6 is opened and closed. As illustrated in FIG. 3, the guide body 16 includes a horizontal roller 41 and a perpendicular roller 42. The horizontal roller 41 and the perpendicular roller 42 are rotatably supported by a bracket 43 (see FIG. 2C) attached to the slide door 6. A latch 44 is attached to the bracket 43. Furthermore, although not illustrated in the drawings, the guide body 14 also includes a horizontal roller 41 and a perpendicular roller 42.

Figure 4:
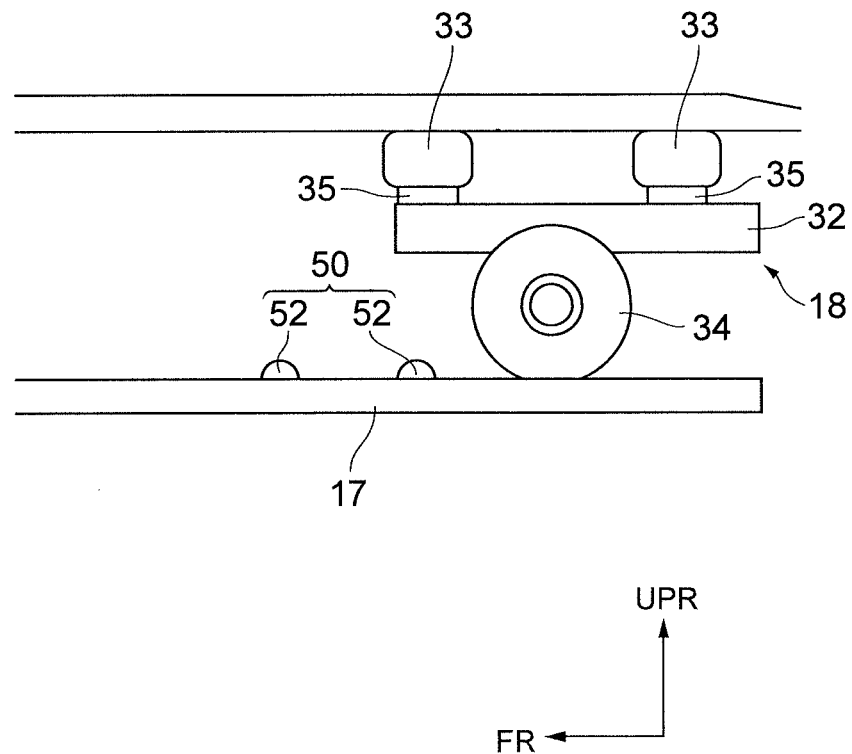
FIG. 4 is a schematic enlarged view illustrating a position that includes a middle slide rail and a guide body illustrated in FIGS. 2A to 2C.

The slide support mechanism 11C includes a middle slide rail 17 that is provided in the swing door 7 so as to extend in the longitudinal direction of the vehicle body 2 and a guide body 18 that is provided in the rear end of the slide door 6 and is guided by the middle slide rail 17 when the slide door 6 is opened and closed. As illustrated in FIG. 4, the guide body 18 includes a pair of front and rear horizontal rollers 33 and a perpendicular roller 34. The perpendicular roller 34 is disposed between the horizontal rollers 33.

The rotation support mechanism 12 includes two upper and lower hinges 24 that rotatably connect the swing door 7 to a rear pillar 23 that is provided in the rear end of the vehicle body 2.

Further, the vehicle door structure 1 further includes two upper and lower door lock mechanisms 25 that lock the slide door 6 and the swing door 7 when the slide door 6 is fully opened so that the slide door 6 overlaps the swing door 7.

As illustrated in even FIG. 3, the door lock mechanism 25 includes a latch 44 that is attached to each of the upper and lower portions of the front end of the slide door 6 and a striker 26 that is attached to each of the upper and lower portions of the front end of the swing door 7 so as to engage with the latch 44.

When the slide door 6 is fully opened so that the latch 44 engages with the striker 26, the slide door 6 is locked to the swing door 7. Furthermore, the locking between the slide door 6 and the swing door 7 may be released when the slide door 6 is closed by the operation of the opening and closing handles 8 and 9.

When the state where the slide door 6 and the swing door 7 are locked to each other is released, the upper and lower guide bodies 14 and 16 are separated from the rear ends of the upper slide rail 13 and the lower slide rail 15. For this reason, the slide door 6 is supported only by the swing door 7 through the door lock mechanism 25, the middle slide rail 17, and the guide body 18, and hence may be rotated along with the swing door 7.

Further, the vehicle door structure 1 includes two upper and lower swing door lock mechanisms 27 that lock the swing door 7 to the vehicle body 2 when the swing door 7 is fully closed. The swing door lock mechanism 27 includes a bar-type lock member 28 that is attached to each of the upper and lower portions of the swing door 7 and a striker 29 (see FIG. 2C) that is attached to each of the upper and lower portions of the vehicle body 2 so as to engage with the lock member 28.

Figure 8:
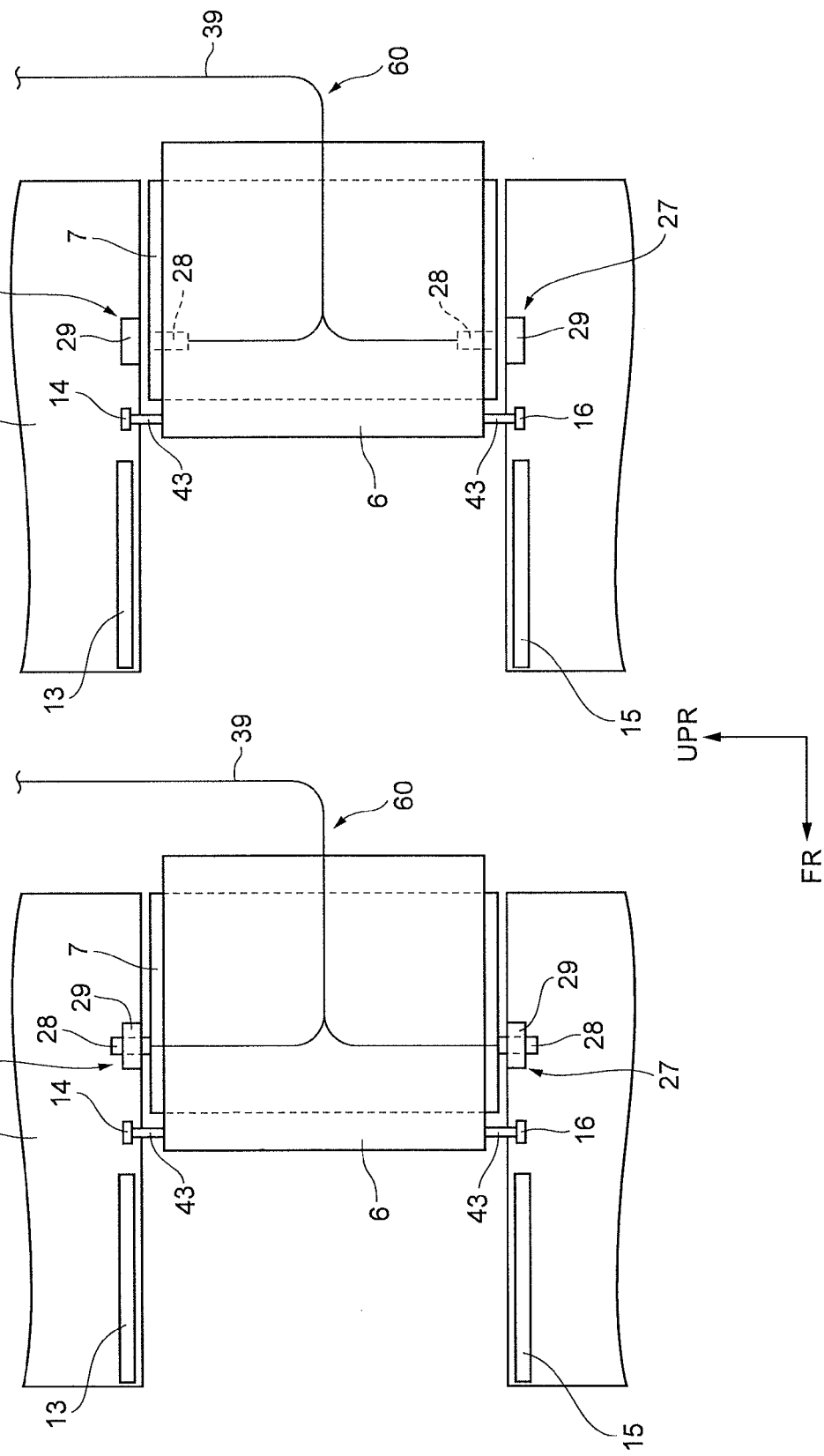
FIGS. 8A and 8B are views illustrating a part of the swing door lock release mechanism illustrated in FIGS. 7A and 7B along with a swing door lock mechanism.
Figure 9:
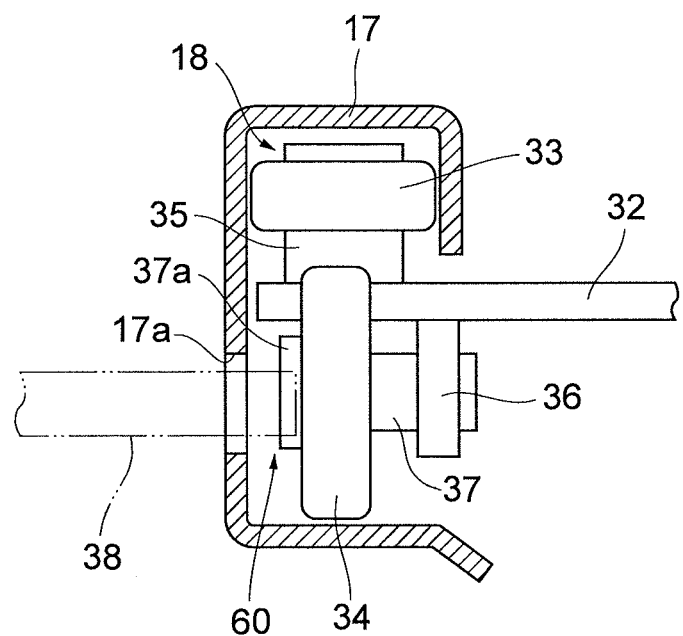
FIG. 9 is a cross-sectional view taken along the line IX-IX of FIGS. 7A and 7B.

When the swing door 7 is fully closed, the lock member 28 protrudes from the swing door 7 toward the vehicle body 2 so as to engage with the striker 29 by a biasing force of a spring (not illustrated), so that the swing door 7 is locked to the vehicle body 2 (see FIG. 8A).

Further, as illustrated in FIGS. 3 and 4, the vehicle door structure 1 includes a slide door opening and closing regulation mechanism 50 that regulates the operation of opening and closing the slide door 6 immediately before the slide door 6 is fully opened. Furthermore, the slide door opening and closing regulation mechanism 50 is not illustrated in FIG. 1.

The slide door opening and closing regulation mechanism 50 includes a pair of front and rear protrusion portions 51 (see FIG. 3) that is provided in the lower portion of the lower slide rail 15 and restrains the perpendicular roller 42 of the guide body 16 in the longitudinal direction of the vehicle body 2 and a pair of front and rear protrusion portions 52 (see FIG. 4) that are provided in the lower portion of the middle slide rail 17 and restrains the perpendicular roller 34 of the guide body 18 in the longitudinal direction of the vehicle body 2.

Figure 5:
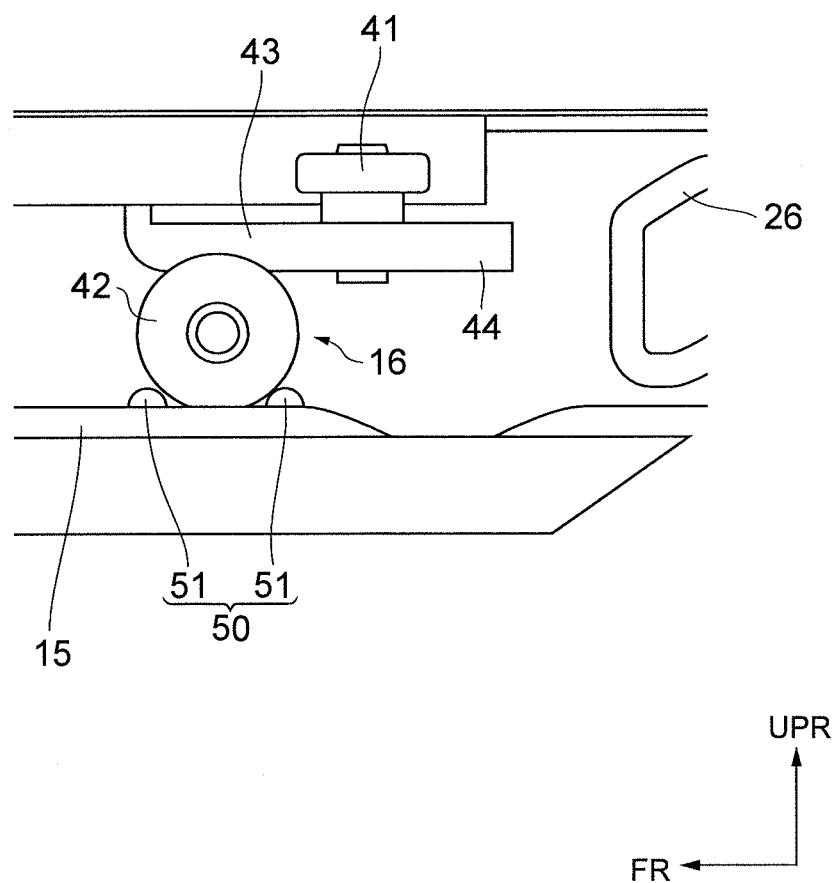
FIG. 5 is a schematic enlarged view illustrating a state where a perpendicular roller of the guide body is restrained by a protrusion portion of the lower slide rail illustrated in FIG. 3.
Figure 6:
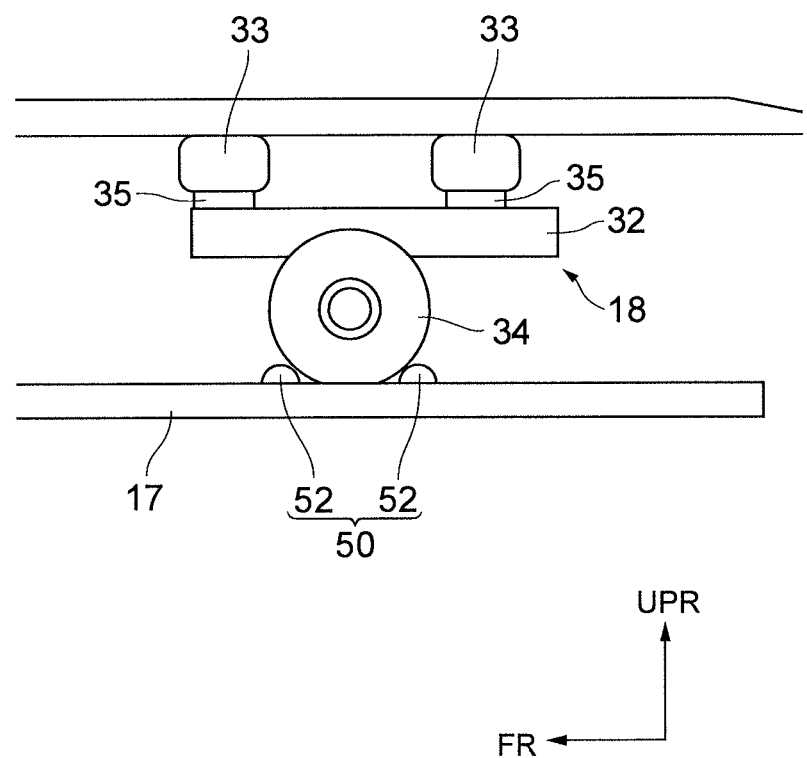
FIG. 6 is a schematic enlarged view illustrating a state where the perpendicular roller of the guide body is restrained by a protrusion portion of the middle slide rail illustrated in FIG. 4.

When the slide door 6 is opened, the perpendicular roller 42 is restrained by each protrusion portion 51 in the longitudinal direction of the vehicle body 2 as illustrated in FIG. 5, and the perpendicular roller 34 is restrained by each protrusion portion 52 in the longitudinal direction of the vehicle body 2 as illustrated in FIG. 6. Accordingly, the operation of opening and closing the slide door 6 is regulated so that the position of the slide door 6 is maintained and fixed before the slide door 6 is fully opened. Further, as illustrated in FIGS. 3 and 4, when the slide door 6 is further opened so that the perpendicular roller 42 runs over each protrusion portion 51 and the perpendicular roller 34 runs over each protrusion portion 52, the slide door 6 may be fully opened.

Further, as illustrated in FIGS. 7A to 8B, the vehicle door structure 1 includes a swing door lock release mechanism 60 that releases the locking of the swing door 7 with respect to the vehicle body 2 when detecting a state where the slide door 6 is fully opened so that the slide door 6 is locked to the swing door 7. Furthermore, the swing door lock release mechanism 60 is not illustrated in FIG. 1. A part of the swing door lock release mechanism 60 is formed by the guide body 18 provided in the slide door 6.

As illustrated in FIGS. 7A to 9, the guide body 18 is attached to a front end of an arm 32 that is substantially formed in an L-shape. The arm 32 is rotatably connected to the slide door 6 so as to extend toward the inside of the vehicle body 2 (toward the swing door 7). The guide body 18 includes the horizontal roller 33 and the perpendicular roller 34. The horizontal roller 33 is rotatably supported by a shaft portion 35 attached to the upper side of the arm 32. The perpendicular roller 34 is rotatably supported by a shaft portion 37 that is attached to the lower side of the arm 32 through a bracket 36.

Figure 7:
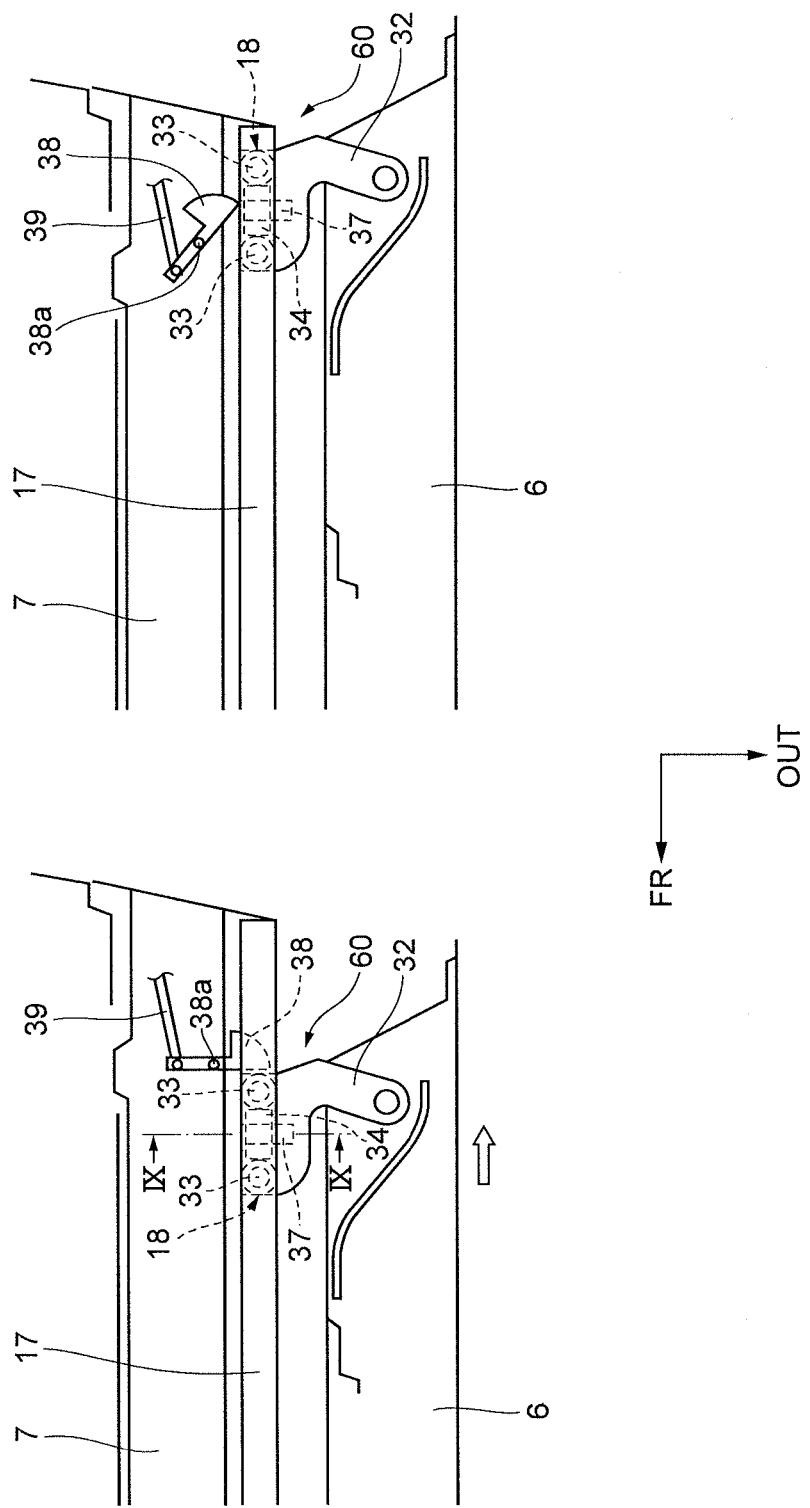
FIGS. 7A and 7B are views illustrating a swing door lock release mechanism along with the middle slide rail and the guide body illustrated in FIGS. 2A to 2C.

Further, as illustrated in FIGS. 7A to 9, the swing door lock release mechanism 60 includes a rotation lever 38 that is swingably (rotatably) attached to the swing door 7 through a shaft portion 38a and engages with a head portion 37a of the shaft portion 37 of the guide body 18 and a cable 39 that connects the rotation lever 38 to the lock member 28 of each swing door lock mechanism 27. The front end of the rotation lever 38 enters the middle slide rail 17 through a notch portion 17a formed in the outer portion of the middle slide rail 17. One end of the cable 39 is connected to the base end of the rotation lever 38. Furthermore, as illustrated in FIG. 7A, the rotation lever 38 is generally maintained in a state where the rotation lever enters the middle slide rail 17 by a biasing force of a spring (not illustrated).

Here, when the slide door 6 is opened while being slid toward the rear side of the vehicle body 2 in a state where the swing door 7 is locked to the vehicle body 2 by the swing door lock mechanism 27, it is detected that the slide door 6 is not fully opened and the slide door 6 and the swing door 7 are not locked to each other at the step before the shaft portion 37 of the guide body 18 contacts the rotation lever 38 as illustrated in FIG. 7A.

Then, when the slide door 6 is further opened so that the shaft portion 37 of the guide body 18 contacts the rotation lever 38 so as to press the rotation lever 38 inward as illustrated in FIG. 7B, it is detected that the slide door 6 is fully opened and the slide door 6 and the swing door 7 are locked to each other. At this time, the rotation lever 38 rotates so that the cable 39 is pulled toward the rotation lever 38. For this reason, as illustrated in FIG. 8B, the lock member 28 is separated from the striker 29 against a biasing force of a spring (not illustrated) so as to be retracted into the swing door 7, and hence the locking between the swing door 7 and the vehicle body 2 is released. Thus, the swing door 7 may be opened.

Figure 10:
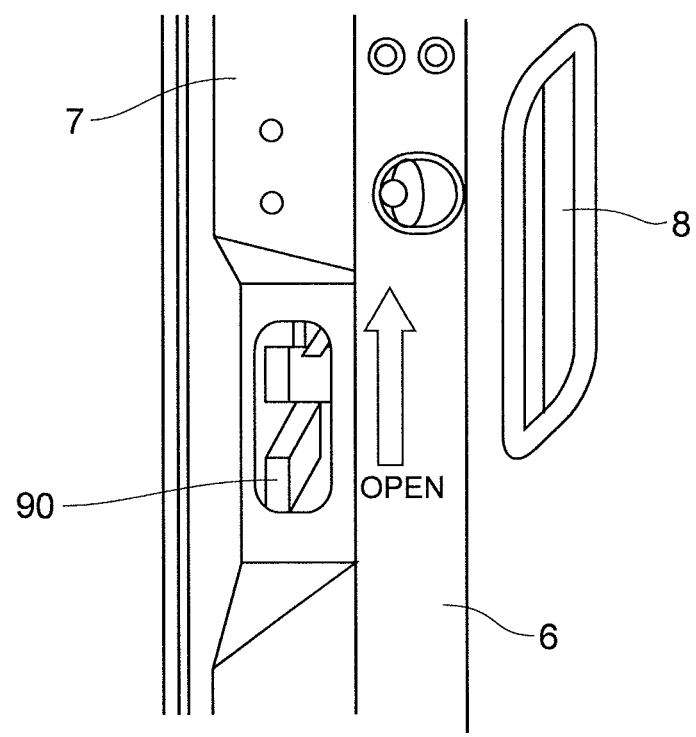
FIG. 10 is a view illustrating a swing door handle that is provided in the swing door as a comparative example.

Incidentally, when the swing door 7 is opened, the swing door 7 is opened after the slide door 6 is fully opened as illustrated in FIGS. 2A to 2C. At this time, in a case where the swing door lock release mechanism 60 is not provided, when the slide door 6 is fully opened and a swing door handle 90 provided in the front end of the swing door 7 is operated as illustrated in FIG. 10, the locking between the swing door 7 and the vehicle body 2 is released, so that the swing door 7 is opened. In this case, since the outer door opening and closing handle 8 or the inner door opening and closing handle 9 needs to be switched by the swing door handle 90, a problem arises in that the workability is degraded.

On the contrary, in this embodiment, when it is detected that the slide door 6 is fully opened and the slide door 6 and the swing door 7 are locked to each other, the swing door 7 may be opened at the time point in which the slide door 6 is fully opened since the swing door lock release mechanism 60 is provided so as to release the locking of the swing door 7 with respect to the vehicle body 2. For this reason, the swing door 7 may be opened by directly using the outer door opening and closing handle 8 or the inner door opening and closing handle 9 after the slide door 6 is fully opened by operating the outer door opening and closing handle 8 or the inner door opening and closing handle 9. Thus, since there is no need to switch the outer door opening and closing handle 8 or the inner door opening and closing handle 9 at each time, the operation efficiency may be improved. Further, since the swing door handle 90 illustrated in FIG. 10 is not needed, the merchantability may be improved.

Further, since there is provided the slide door opening and closing regulation mechanism 50 that regulates the operation of opening and closing the slide door 6 immediately before the slide door 6 is fully opened, the position of the slide door 6 may maintained and fixed while the swing door 7 is locked to the vehicle body 2 and the slide door 6 is opened by a predetermined amount. Accordingly, in a case where a luggage is carried into or out of the luggage compartment by opening and closing only the slide door 6 while the swing door 7 is not opened and closed, there is no need to lock the slide door 6 and the swing door 7 at each time. Thus, the operation efficiency may be further improved.

Figure 11:
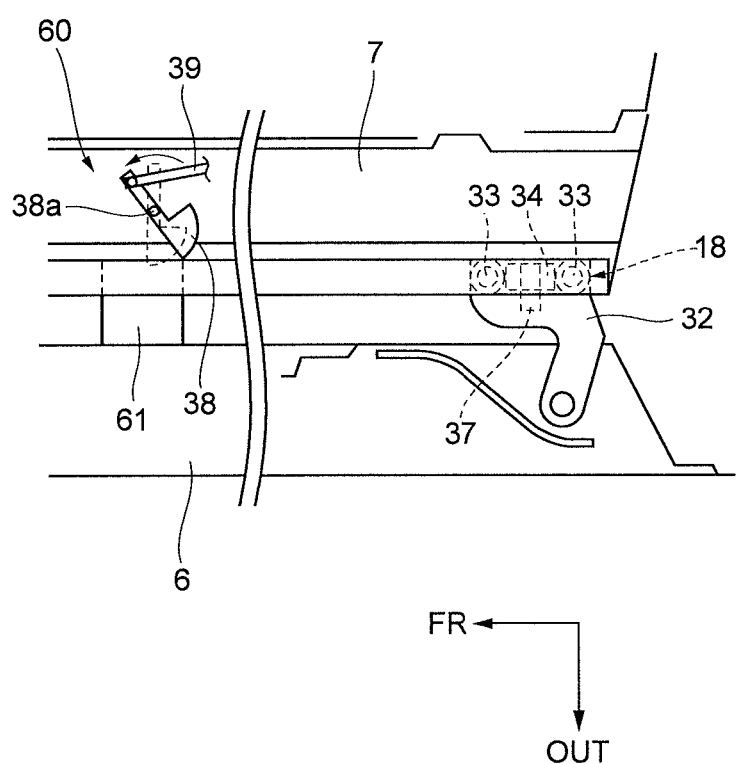
FIG. 11 is a view illustrating a modified example of the swing door lock release mechanism illustrated in FIGS. 7A and 7B as another embodiment of the vehicle door structure according to the present invention.

FIG. 11 is a view illustrating a modified example of the swing door lock release mechanism 60 illustrated in FIGS. 7A and 7B as another embodiment of the vehicle door structure according to the present invention. In the same drawing, the swing door lock release mechanism 60 of this modified example includes a detection protrusion portion 61 that is fixed to the inner side surface of the slide door 6. The protrusion portion 61 is formed so as to enter the middle slide rail 17. Further, the protrusion portion 61 is disposed at the front side of the guide body 18 in the slide door 6.

Further, the swing door lock release mechanism 60 includes the rotation lever 38 and the cable 39 as in the above-described embodiment. The rotation lever 38 is a rotation member that engages with the protrusion portion 61.

In such a swing door lock release mechanism 60, when the protrusion portion 61 contacts the rotation lever 38 so as to press the rotation lever 38, the slide door 6 is fully opened and the slide door 6 and the swing door 7 are locked to each other. At this time, since the rotation lever 38 rotates so that the cable 39 is pulled toward the rotation lever 38 as in the above-described embodiment, the lock member 28 is separated from the striker 29 so that the locking between the swing door 7 and the vehicle body 2 is released.

Figure 13:
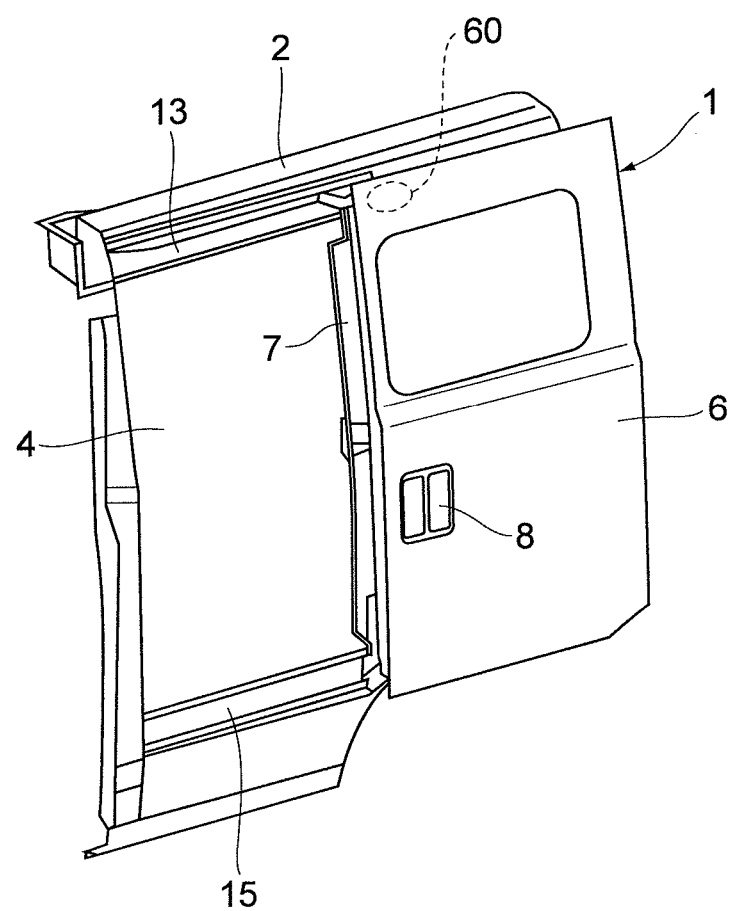
FIG. 13 is a view illustrating the arrangement position of the swing door lock release mechanism illustrated in FIG. 12.

FIG. 12 is a view illustrating another modified example of the swing door lock release mechanism 60 illustrated in FIGS. 7A and 7B as still another embodiment of the vehicle door structure according to the present invention. In the same drawing, the swing door lock release mechanism 60 of this modified example is provided in the upper portions of the front ends of the slide door 6 and the swing door 7 as illustrated in FIG. 13. Furthermore, the swing door lock release mechanism 60 may be provided in the lower portions of the front ends of the slide door 6 and the swing door 7.

The swing door lock release mechanism 60 includes a detection protrusion portion 65 that is fixed to the inner side surface of the upper portion of the front end of the slide door 6. The rotation lever 38 is rotatably attached to the upper portion of the front end of the swing door 7. The rotation lever 38 is a rotation member that engages with the protrusion portion 65. Further, the swing door lock release mechanism 60 includes the cable 39.

In such a swing door lock release mechanism 60, when the protrusion portion 65 contacts the rotation lever 38 so as to press the rotation lever 38, the slide door 6 is fully opened and the slide door 6 and the swing door 7 are locked to each other. At this time, since the rotation lever 38 rotates so that the cable 39 is pulled toward the rotation lever 38 as in the above-described embodiment, the lock member 28 is separated from the striker 29 so that the locking between the swing door 7 and the vehicle body 2 is released.

Figure 14:
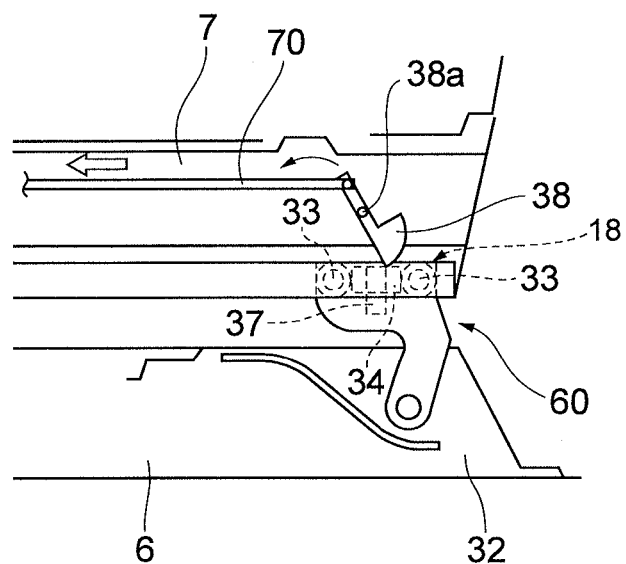
FIG. 14 is a view illustrating still another modified example of the swing door lock release mechanism illustrated in FIGS. 7A and 7B as still another embodiment of the vehicle door structure according to the present invention.
Figure 15:
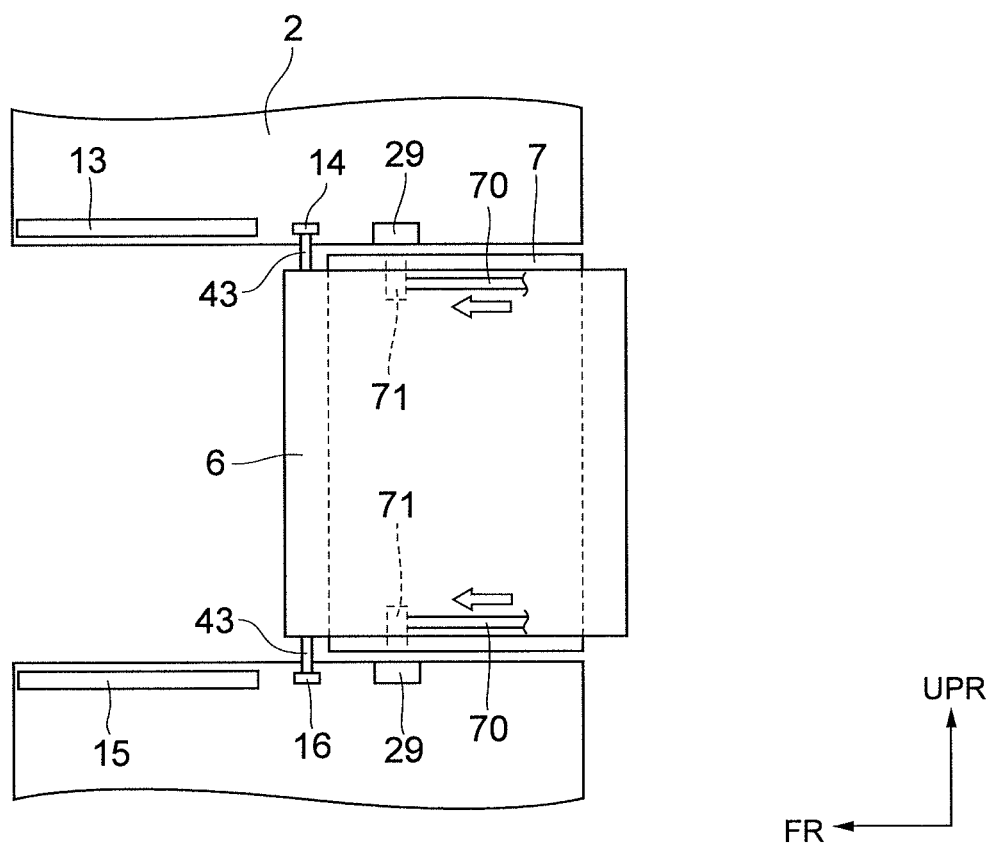
FIG. 15 is a view illustrating a part of the swing door lock release mechanism illustrated in FIG. 14 along with the swing door lock mechanism.

FIG. 14 is a view illustrating still another modified example of the swing door lock release mechanism 60 illustrated in FIGS. 7A and 7B as still another embodiment of the vehicle door structure according to the present invention. In the same drawing, the swing door lock release mechanism 60 of this modified example includes a rod 70 instead of the cable 39. One end of the rod 70 is connected to the base end of the rotation lever 38. As illustrated in FIG. 15, the other end of the rod is branched into two parts. Further, the swing door lock release mechanism 60 includes a rotation type lock member 71 instead of the bar-type lock member 28.

Figure 16A:
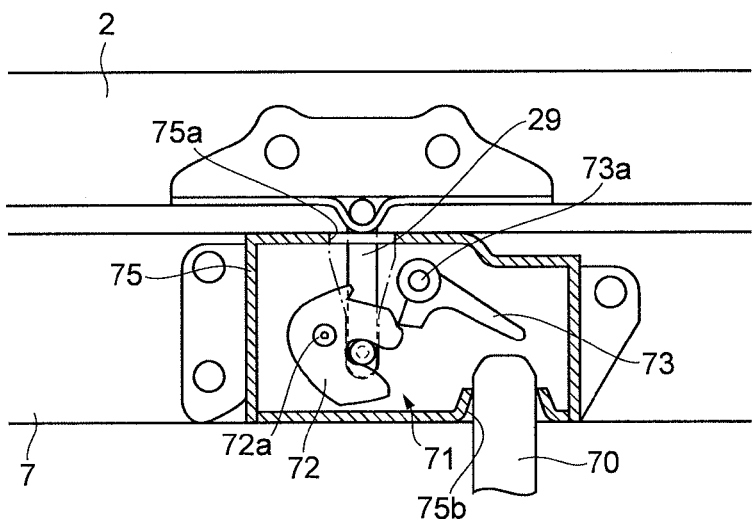
FIGS. 16A to 16C are views illustrating the structure of a lock member illustrated in FIG. 15.
Figure 16B:
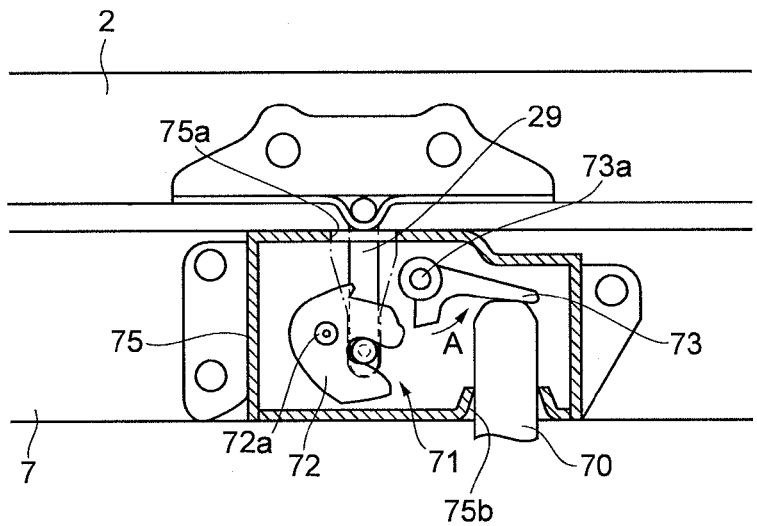
Figure 16C:
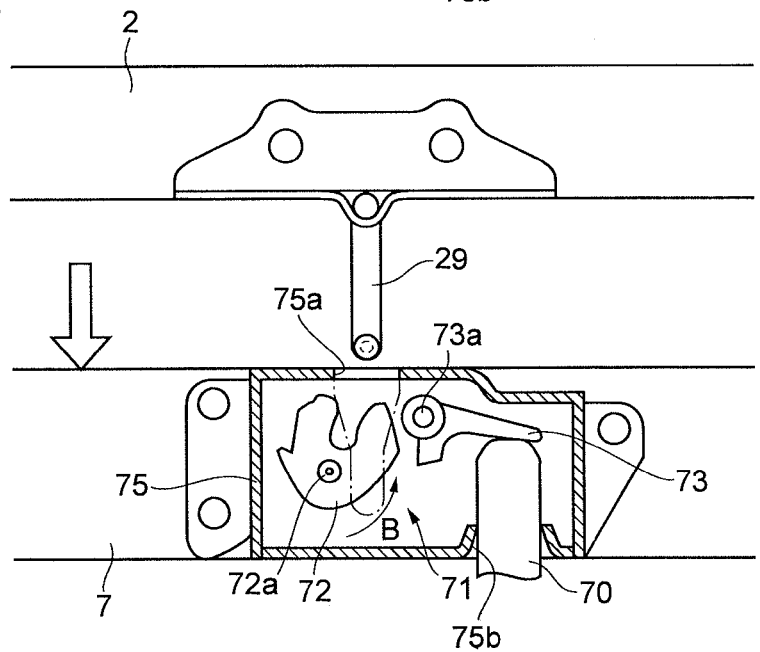

As illustrated in FIGS. 16A to 16C, the lock member 71 is accommodated inside a housing 75 attached to the swing door 7. The lock member 71 includes a latch portion 72 and a rod receiving portion 73 that engages with the latch portion 72. The housing 75 is provided with a striker introduction portion 75a into which the striker 29 is introduced and a rod introduction portion 75b into which the rod 70 is introduced. The latch portion 72 is rotatably supported by the swing door 7 through the shaft portion 72a. The rod receiving portion 73 is rotatably supported by the swing door 7 through the shaft portion 73a. The latch portion 72 is biased by a spring (not illustrated) in a counter-clockwise direction, and the rod receiving portion 73 is biased by a spring (not illustrated) in a clockwise direction.

In such a swing door lock release mechanism 60, the rod 70 does not contact the rod receiving portion 73 as illustrated in FIG. 16A before the shaft portion 37 of the guide body 18 contacts the rotation lever 38, that is, the slide door 6 is fully opened. In this state, when the rod receiving portion 73 engages with the latch portion 72 and the latch portion 72 engages with the striker 29 against a biasing force of a spring (not illustrated), the swing door 7 is locked to the vehicle body 2.

As illustrated in FIG. 14, the shaft portion 37 of the guide body 18 contacts the rotation lever 38 so as to press the rotation lever 38 and the slide door 6 is fully opened, the rod 70 is pulled toward the lock member 71 by the rotation of the rotation lever 38. Then, as illustrated in FIG. 16B, since the rod 70 presses the rod receiving portion 73, the rod receiving portion 73 rotates in a counter-clockwise direction (see the arrow A) against a biasing force of a spring (not illustrated) and the engagement between the rod receiving portion 73 and the latch portion 72 is released. As a result, as illustrated in FIG. 15, the locking between the swing door 7 and the vehicle body 2 is released, so that the swing door 7 may be opened.

Then, as illustrated in FIG. 16C, when the swing door 7 is opened, the engagement between the latch portion 72 and the striker 29 is released by the movement of the swing door 7, so that the latch portion 72 rotates in a counter-clockwise direction by a biasing force of a spring (not illustrated) (see the arrow B).

Figure 17:
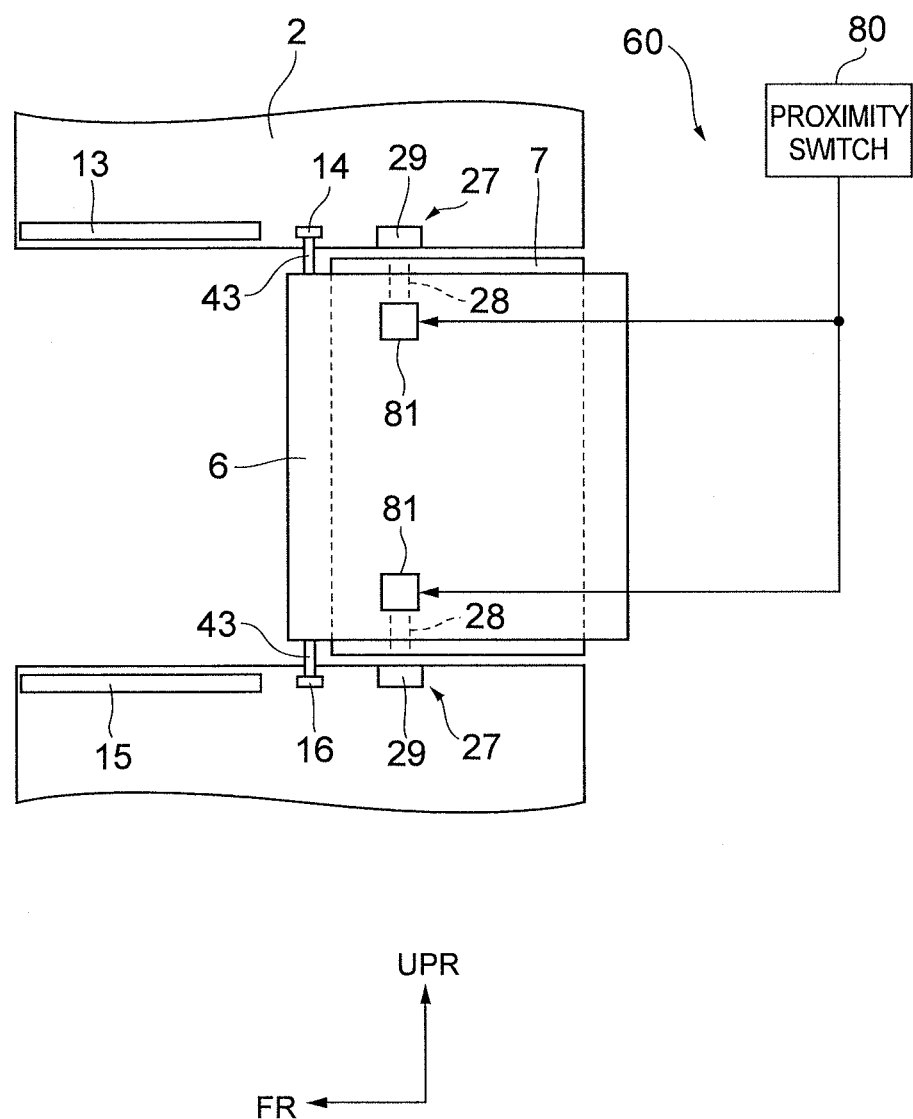
FIG. 17 is a view illustrating a modified example of the swing door lock release mechanism illustrated in FIGS. 8A and 8B as still another embodiment of the vehicle door structure according to the present invention along with the swing door lock mechanism.

FIG. 17 is a view illustrating still another modified example of the swing door lock release mechanism 60 illustrated in FIGS. 8A and 8B as still another embodiment of the vehicle door structure according to the present invention along with the swing door lock mechanism 27. In the same drawing, the swing door lock release mechanism 60 of this modified example includes a proximity switch 80 and two drive units 81 instead of the rotation lever 38 and the cable 39.

Figure 18:
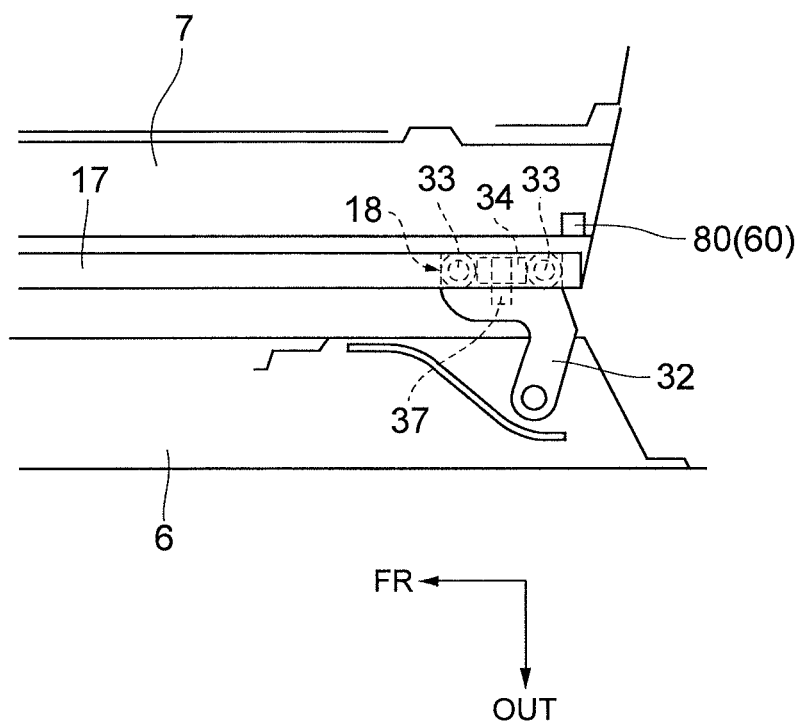
FIG. 18 is a view illustrating the arrangement position of a proximity switch illustrated in FIG. 17.

As illustrated in FIG. 18, the proximity switch 80 is disposed in the rear end of the swing door 7. The proximity switch 80 is a switch that detects whether the slide door 6 is fully opened by detecting whether the guide body 18 approaches. When the guide body 18 does not approach the proximity switch 80, that is, the slide door 6 is not fully opened, the proximity switch 80 becomes an off state. Meanwhile, when the guide body 18 approaches the proximity switch 80, that is, the slide door 6 is fully opened, the proximity switch 80 becomes an on state.

Each drive unit 81 is configured as an electromagnetic solenoid connected to the proximity switch 80. When the proximity switch 80 becomes an off state, the drive unit 81 causes the lock member 28 to engage with the striker 29. Then, when the proximity switch 80 becomes an on state, the drive unit 81 moves the lock member 28 in a direction in which the lock member is separated from the striker 29. Furthermore, the drive unit 81 may be configured by the combination of, for example, an electric motor and a gear or a ball screw.

In this way, in this embodiment, when it is detected that the slide door 6 is fully opened and the slide door 6 and the swing door 7 are locked to each other, the locking of the swing door 7 with respect to the vehicle body 2 is electrically released.

Furthermore, the present invention is not limited to the above-described embodiment. For example, in the embodiment illustrated in FIGS. 7A, 7B, and 14, the shaft portion 37 of the guide body 18 becomes a detection component that engages with the rotation lever 38. However, for example, the detection protrusion portion that engages with the rotation lever 38 may be provided in the shaft portion 37.

Further, in the above-described embodiment, the slide door opening and closing regulation mechanism 50 includes the pair of front and rear protrusion portions 51 provided in the lower portion of the lower slide rail 15 and the pair of front and rear protrusion portions 52 provided in the lower portion of the middle slide rail 17, but may include any one of the protrusion portions 51 and 52.

Further, in the above-described embodiment, the slide door 6 is adapted to open and close the front area of the rear door opening portion 4, and the swing door 7 is adapted to open and close the rear area of the rear door opening portion 4 along with the slide door 6. However, the vehicle door structure of the present invention may be applied to a vehicle in which the slide door 6 is adapted to open and close the rear area of the rear door opening portion 4 and the swing door 7 is adapted to open and close the front area of the rear door opening portion 4 along with the slide door 6. Further, the vehicle door structure of the present invention may be applied to a vehicle that includes a slide door and a swing door that are used to open and close a door opening portion provided in the rear portion of the vehicle body 2.

What is claimed is:

1. A vehicle door structure equipped with a slide door that opens and closes a partial area of a door opening portion provided in a side portion or a rear portion of a vehicle body and a swing door that opens and closes the other partial area of the door opening portion along with the slide door, the slide door being positioned outside of the swing door so as to overlap therewith when the slide door is in a fully opened state, the vehicle door structure comprising:
    a slide door handle that is provided in the slide door so as to open and close the slide door;
    a lock unit that locks the swing door to the vehicle body when the swing door is fully closed; and
    a lock release unit that releases the locking of the lock unit of the swing door with respect to the vehicle body when the fully opened state of the slide door is detected, so as to allow simultaneous rotation of the swing door and the slide door with respect to the vehicle body.

2. The vehicle door structure according to claim 1, further comprising:
    a slide door opening and closing regulation unit that regulates an operation of opening and closing the slide door before the slide door is fully opened.

3. The vehicle door structure according to claim 2,
    wherein the vehicle body is provided with a first slide rail that extends in the slide door opening and closing direction,
    wherein the swing door is provided with a second slide rail that extends in the slide door opening and closing direction,
    wherein the slide door is provided with a first guide body guided by the first slide rail and a second guide body guided by the second slide rail, and
    wherein the slide door opening and closing regulation unit is configured as a plurality of protrusion portions that are provided in at least one of the first slide rail and the second slide rail and regulate a roller of at least one of the first guide body and the second guide body in the slide door opening and closing direction.

4. A vehicle door structure equipped with a slide door that opens and closes a partial area of a door opening portion provided in a side portion or a rear portion of a vehicle body and a swing door that opens and closes the other partial area of the door opening portion along with the slide door, the vehicle door structure comprising:
    a slide door handle that is provided in the slide door so as to open and close the slide door;
    a lock unit that locks the swing door to the vehicle body when the swing door is fully closed; and
    a lock release unit that releases the locking of the lock unit of the swing door with respect to the vehicle body when the fully opened state of the slide door is detected,
    wherein the lock unit includes a lock member that is provided in the swing door and an engagement portion that is provided in the vehicle body and engages with the lock member, and wherein the lock release unit includes a detection component that is provided in the slide door, a rotation member that is rotatably provided in the swing door and engages with the detection component when the slide door is fully opened, and a connection member that connects the lock member to the rotation member.

5. The vehicle door structure according to claim 4,
wherein the swing door is provided with a slide rail that extends in the slide door opening and closing direction,
wherein the slide door is provided with a guide body that is guided by the slide rail, and
wherein the detection component is the guide body.

6. The vehicle door structure according to claim 4,
wherein the slide door is provided with a protrusion portion that protrudes toward the swing door, and
wherein the detection component is the protrusion portion.

7. A vehicle door structure equipped with a slide door that opens and closes a partial area of a door opening portion provided in a side portion or a rear portion of a vehicle body and a swing door that opens and closes the other partial area of the door opening portion along with the slide door, the vehicle door structure comprising:
   a slide door handle that is provided in the slide door so as to open and close the slide door;
   a lock unit that locks the swing door to the vehicle body when the swing door is fully closed; and
   a lock release unit that releases the locking of the lock unit of the swing door with respect to the vehicle body when the fully opened state of the slide door is detected,
wherein the lock unit includes a lock member that is provided in the swing door and an engagement portion that is provided in the vehicle body and engages with the lock member, and
wherein the lock release unit includes a sensor that detects whether the slide door is fully opened and a drive unit that moves the lock member so that the lock member is separated from the engagement portion when the sensor detects that the slide door is fully opened.

* * * * *